D. R. BOWEN AND C. F. SCHNUCK.
MACHINE FOR TREATING RUBBER AND SIMILAR MATERIAL.
APPLICATION FILED SEPT. 14, 1917.

1,379,616.

Patented May 31, 1921.
6 SHEETS—SHEET 1.

D. R. BOWEN AND C. F. SCHNUCK.
MACHINE FOR TREATING RUBBER AND SIMILAR MATERIAL.
APPLICATION FILED SEPT. 14, 1917.

1,379,616.

Patented May 31, 1921.
6 SHEETS—SHEET 5.

UNITED STATES PATENT OFFICE.

DAVID R. BOWEN AND CARL F. SCHNUCK, OF ANSONIA, CONNECTICUT, ASSIGNORS TO FARREL FOUNDRY AND MACHINE COMPANY, OF ANSONIA, CONNECTICUT, A CORPORATION OF CONNECTICUT.

MACHINE FOR TREATING RUBBER AND SIMILAR MATERIAL.

1,379,616.  Specification of Letters Patent.  Patented May 31, 1921.

Application filed September 14, 1917. Serial No. 191,413.

*To all whom it may concern:*

Be it known that we, DAVID R. BOWEN and CARL F. SCHNUCK, both citizens of the United States, and both residing in Ansonia, county of New Haven, State of Connecticut, have invented certain new and useful Improvements in Machines for Treating Rubber and Similar Material, of which the following is a full, clear, and exact description.

This invention relates to machines for treating rubber and similar material, and it has particular reference to machines for masticating, working, kneading or mixing rubber which is to be used for various industrial purposes. Our improved machine is particularly intended to convert a mixture of various materials of which the particles vary considerably in character, size and consistency, into a smooth, readily workable, plastic mass in which the distribution of the several ingredients is uniform throughout. The machine may be very advantageously used, for example, in reducing to a smooth, uniform, plastic mass a mixture of rubber chunks of various sizes, pieces of tar, and filling or coloring material in powdered form, although it will be obvious from the following description that we do not limit ourselves to this particular use and that the machine will be of utility in the working, mastication or mixing of different kinds of plastic material.

One of the primary objects of our invention is the provision of a machine of the character indicated in which the working or kneading action is extremely thorough and efficient.

Another object of our invention is to furnish a masticator or similar machine which will break up the rubber or other material and reduce it in a comparatively short time to a smooth, homogeneous mass.

It is also an object of our invention to make the machine construction of maximum simplicity, and at the same time to furnish a machine having a comparatively large output. More especially, it is aimed to provide a rubber mixing machine which can advantageously comprise a single mixing cylinder or chamber, as distinguished from a plurality of such cylinders or chambers, although in some aspects of the invention this feature is unessential.

The invention also has in view the provision of a very efficient single cylinder machine; the production of an improved form of mixing chamber or cylinder and an improved form of rotor; a considerable improvement in the method of constructing the rotor bearings; the provision of an efficient and simple form of cylinder or chamber closure which can be readily opened for the rapid and thorough discharge of the contents of the mixing chamber; and the general improvement in construction and operation of devices of the class to which the invention relates.

To these and other ends, the invention consists in the novel features, parts and combinations of parts to be hereinafter described and claimed.

Reference is to be had to the accompanying drawings forming part of the specification, wherein—

Figure 1 is an end elevation of a mixer or masticator embodying our improvements;

Fig. 2$^A$ is a horizontal section through the body portion of the machine, taken on line 2$^A$—2$^A$ of Fig. 4;

In the particular machine selected for illustration in the present application, the structure is characterized by a generally cylindrical mixing chamber which is adapted to be supported above the floor level and in which there is journaled a single, approximately central mixing element or rotor adapted to be driven by power applied to the rotor shaft. This machine is intended to be charged at the top and discharged at the bottom, for which purpose the mixing chamber is provided at its upper portion with a stack or chute into which the material to be treated is charged, said stack or chute being provided interiorly with a fluid pressure operated plunger or ram for forcing the material down into the mixing chamber against the rotor, while the lower part of the mixing chamber is movably mounted to permit the discharge of the mixed material when the operation has been completed. Many of these features, however, are susceptible of very considerable modification without departing from the scope of our invention, which concerns itself chiefly in its primary aspect with the form of the mixing chamber and rotor and the manner in which said parts coöperate.

In the example illustrated, a mixing chamber 20 of generally cylindrical shape is mounted between suitable standards, pedestals or end frames 21, having heads 22 which close the cylinder at the respective ends. The end frames and the body portion of the cylinder may be conveniently interconnected by bolts 24. A rotary mixing element or rotor 25 is provided within the mixing chamber in a substantially central location, said rotor having a horizontal shaft $25^x$ with bearings in the respective end frames, that portion of the shaft within the cylinder being provided with one or more blades for masticating or kneading the material, as hereinafter described. The bearings for the rotor shaft $25^x$ may be conveniently formed in adjustable stuffing box glands 26 located in the respective end frames at the ends of the cylinder, and preferably made of brass or other suitable bearing metal. The stuffing boxes with which the glands 26 are associated are adapted to prevent escape from the ends of the cylinder around the shaft of the material being treated, and they comprise one or more rings 27 of suitable packing or the like, fitted in a recess around the shaft and compressed by the corresponding gland which is adjustable by means of bolts 28. In the example shown, the shaft $25^x$ is adapted to be rotated in the direction of the arrow (Fig. 2) by power applied to a pulley (not shown) on one end of the shaft.

Figures 1, 2A:
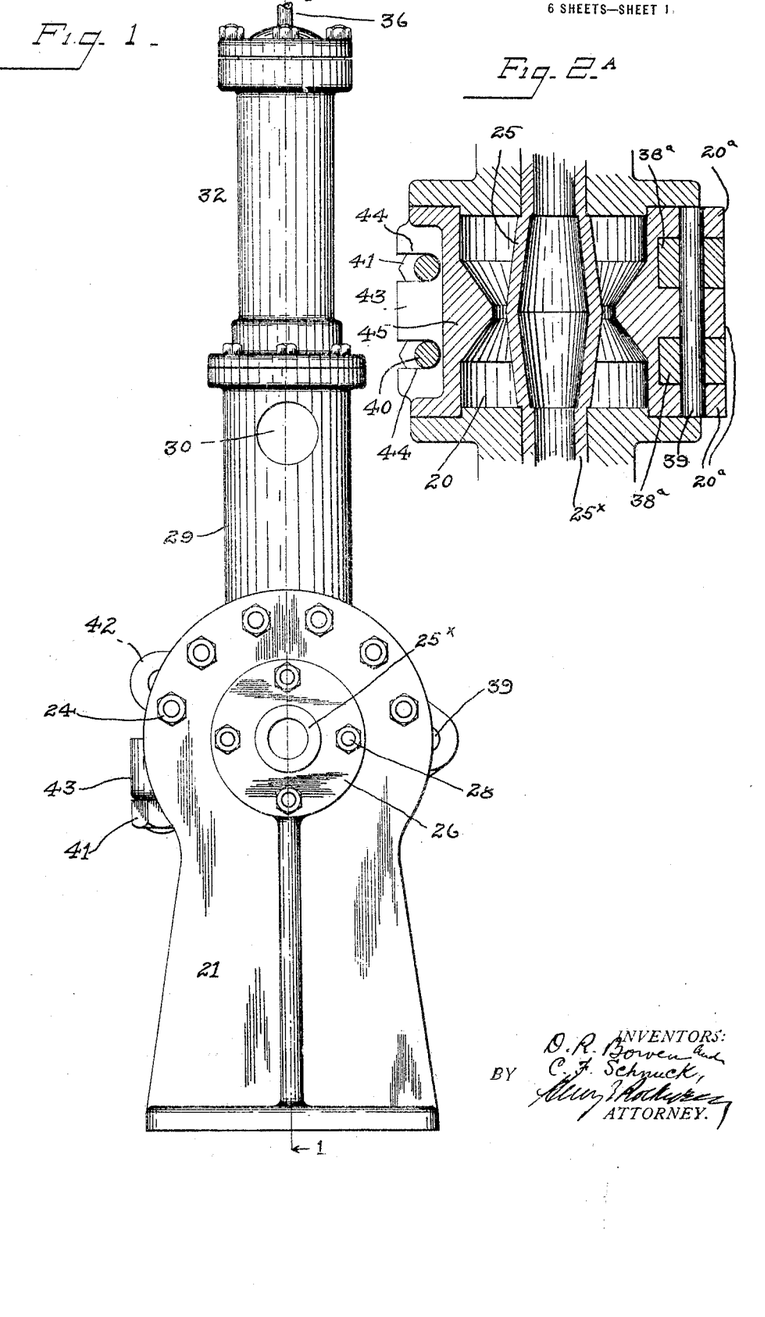

At the upper portion of the mixing chamber, the same is provided with an upright stack, chute or chimney 29, which may be conveniently cast integral with the main body portion of the cylinder. Near the upper end of the stack or chute is a charging opening 30 through which material to be treated is introduced, and operating in the stack is a charging device in the form of a pressure plunger 31, movable up and down by a fluid pressure cylinder and piston device 32, supported on top of the stack. The plunger 31 has a rod 33 extending upward into the cylinder 34, and on the rod 33 is a piston 35. In the particular example shown, the plunger 31 is hydraulically operated, for which purpose a water connection 36 is provided at the top of the cylinder 34 above piston 35, while a second water connection 37 is provided at the lower part of the cylinder. The connections 36, 37 are controlled by valves in an obvious manner, so as to produce the upward and downward movement of the pressure plunger 31 in a manner which is well understood in the art. When the material to be treated has been introduced into the mixing chamber through the opening in the stack, the pressure plunger 31 is forced down so as to push the mass forcibly into the mixing chamber, and hold it in contact with the rotating blade or blades therein, whereby such material is effectively acted upon by such blade or blades. When the mixing or masticating operation has been completed, the machine is discharged by moving the lower part of the mixing chamber relatively to the upper part in such a manner that an opening is presented for the discharge of the material, usually in a downward direction. For this purpose the machine shown in the drawing has the entire lower portion 38 of chamber 20 arranged so that it can be moved downward to open the lower part of the machine, and the movable wall portion 38 of the chamber is preferably hinged at one side of the chamber, as shown at 39, so that it can swing downward into the discharging position shown in Fig. 5. In the particular example illustrated, the lower movable section 38 comprises approximately half of the main mixing chamber wall, said mixing chamber being divided longitudinally and diametrically, but, of course, this is not essential in all cases. Furthermore, the method of hinging the movable section 38 and the means for locking it in place may vary considerably as called for by different conditions. In the case under discussion, the hinge connection 39 consists of a pintle which passes through alternately arranged knuckles on the main body of the chamber wall and on the movable part 38. In Fig. $2^A$, it will be observed that the knuckles of the main or body portion of the chamber wall are indicated at $20^a$, while the knuckles of part 38 are designated $38^a$. At the opposite side of the mixing chamber, swinging locking bolts 40 having nuts 41 are pivoted to lugs 42 on the body portion of the chamber, so as to hang down therefrom, and the nuts 41 are adapted to engage the under surface of a lateral slotted lug or flange 43 at the free edge of the hinged section 38 to clamp the two sections of the casing or chamber together. The lug 43 is provided with slots 44 into which the bolts 40 are adapted to swing, as shown more particularly in Fig. 2ᴬ. By screwing up the nuts 41, the machined meeting edges of the casing or chamber sections may be forced into tight contact to prevent effectively the escape of any of the treated material at the joint between the sections.

One of the primary objects of our invention is to provide a coöperating mixing chamber and rotor of such form and relative arrangement as to produce an especially effective masticating and mixing action on the rubber or other material. To this end, the rotor 25 is provided with a blade or blades which not only have an effective wedging or mashing action to wedge or mesh the material against the wall of the chamber, but also have a sort of extruding action in forcing the material (usually in a generally longitudinal direction) through one or more constricted portions of the chamber which is available for holding the material to be treated. Preferably the available space in the mixing chamber for holding the rubber will be most constricted at an intermediate point in the cylinder length, and the rotor will have blades at opposite ends of the chamber which force the rubber through the constricted portion, first in one direction, generally lengthwise of the cylinder, and then in the opposite direction, so that the mass of rubber is worked alternately from one end of the mixing chamber to the other; although in some aspects of the invention all these features are not essential. In the preferred form, however, the constriction of the mixing chamber is intermediate of the ends and the blades are so arranged that after one blade has forced or extruded the material through the constricted portion into one end of the cylinder, another blade located at that end then takes up the work and ejects the material from said end of the cylinder back into that end in which it was initially located, and so on, the working action of the blades on the material being substantially continuous. By preference, also, the constriction of the material-holding space of the mixing chamber will be provided by a transverse rib or similar constriction formed on or associated with the generally cylindrical wall of the chamber, although we do not limit ourselves in all aspects of the invention to a construction in which the rib or equivalent device, coöperating with the blade or blades in producing the extruding effect, is located on the chamber wall.

Figure 2:
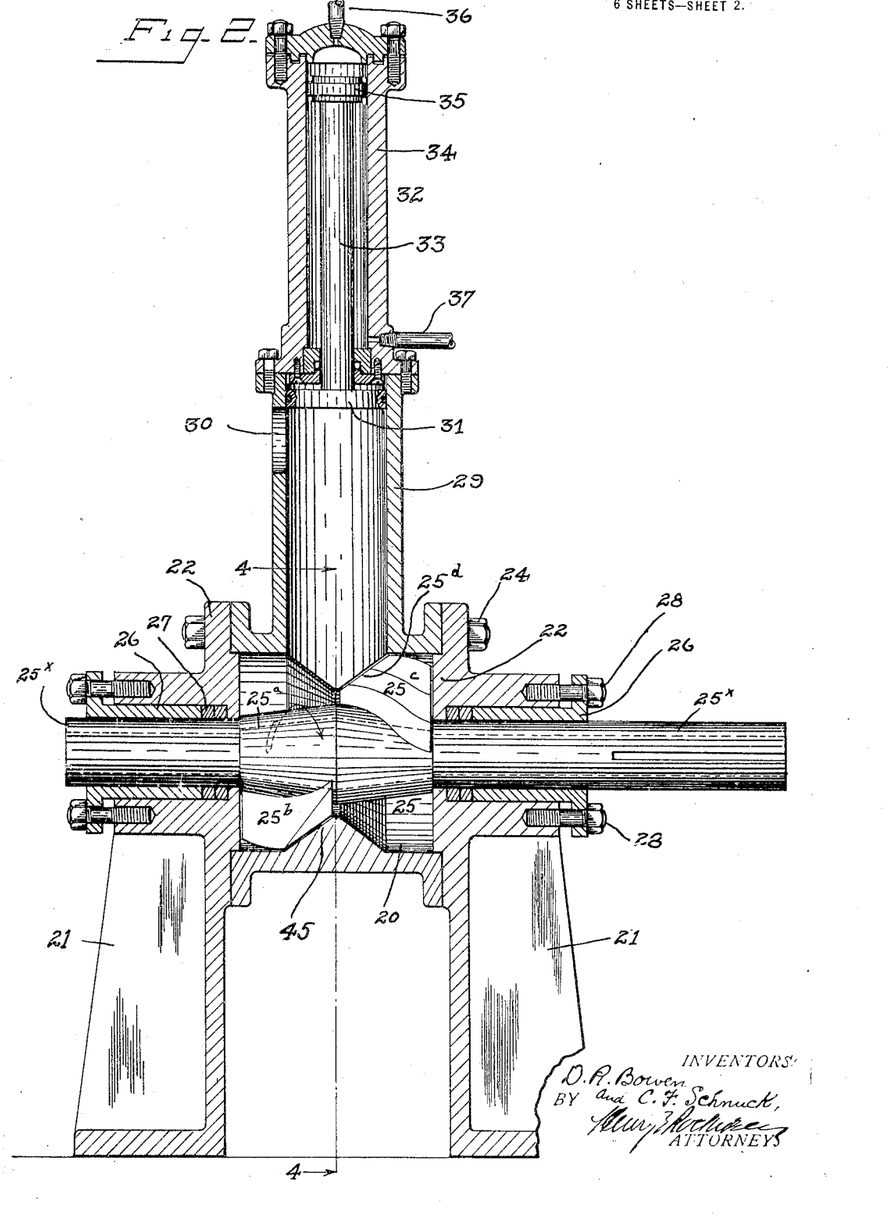
Fig. 2 is a vertical, longitudinal section with the mixing chamber closed and the pressure plunger in the raised position.
Figure 3:
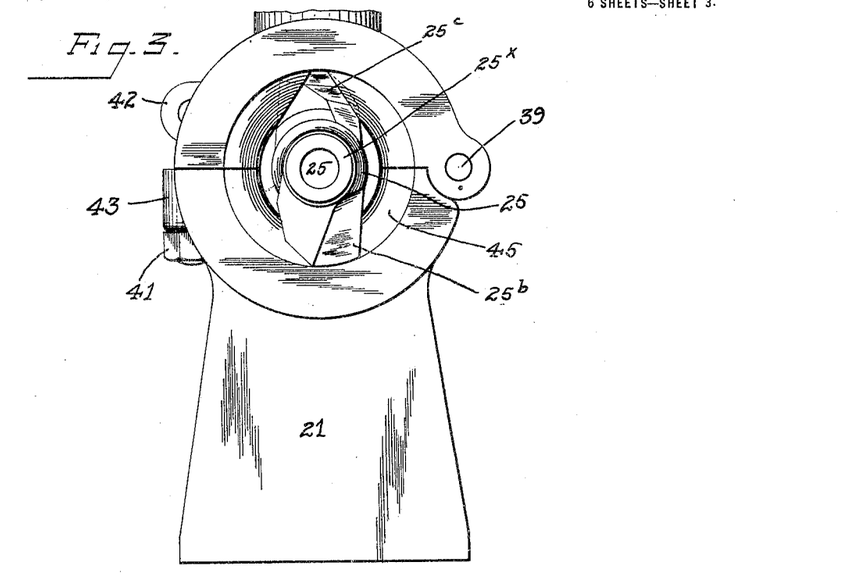
Fig. 3 is an end elevation of a portion of the machine with one of the end frames omitted.
Figure 4:
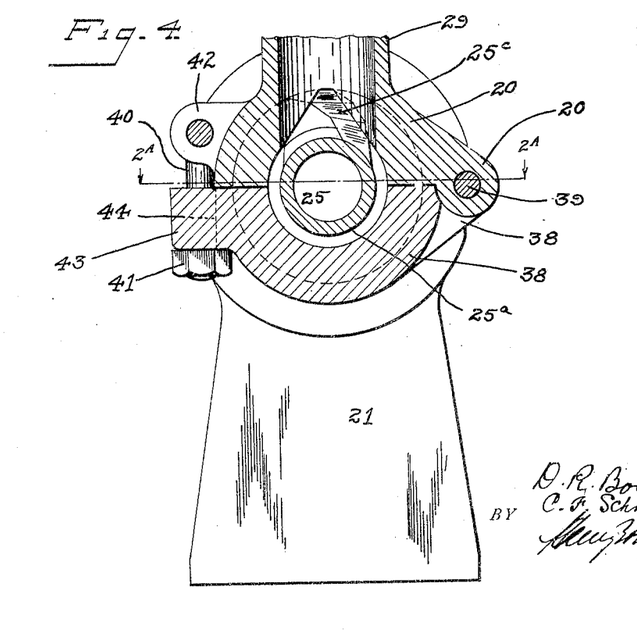
Fig. 4 is a section on line 4—4 of Fig. 2.
Figure 10:
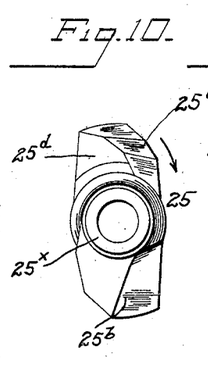
Figs. 10 and 11 are a detail end view and a transverse section, respectively, of the rotor shown in Fig. 6.
Figure 11:
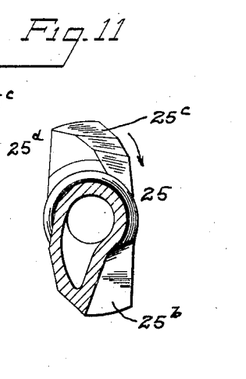

In the example shown in Fig. 2 the rotor is provided within the mixing chamber with an enlargement or hub 25ᵃ, on which two blades 25ᵇ are provided, one of said blades being located in one end of the mixing chamber and the other in the opposite end. These blades, moreover, are located approximately diametrically with respect to the shaft axis, as shown, for example, in Fig. 10. In this particular example each blade extends approximately throughout one half of the mixing chamber length, and both blades coöperate with a transverse rib or ridge 45 on the chamber wall, located intermediate of the ends of the chamber. As illustrated, this rib is continuous except for the interruption at the upper part where the stack 29 communicates with the upper part of the chamber and the blades 25ᵇ are so shaped as to coöperate with the rib 45 in producing an extrusion of the rubber from one end of the chamber to the other and back again. The blades 25ᵇ are provided with faceted working faces 25ᶜ which effectively grip the material and force it against the cylindrical wall of the mixing chamber as the rotor rotates, while at the same time the material is forced lengthwise of the chamber by inclining the blades relatively to the shaft axis. Referring particularly to Fig. 2, it will be observed that when the rotor is rotated in the direction of the arrow, the faceted working surfaces 25ᶜ of the blades will have a wedging and mashing action on the material which is forced thereby into contact with the cylindrical wall of the chamber while at the same time the inclination of the blades relatively to the axis of the rotor causes the upper blade, shown in Fig. 2 to work the material toward the left while the lower blade forces the material to the right. This movement of the material lengthwise of the chamber necessitates its passage through the constricted portion of the chamber, provided or created by the transverse rib 45, and the blades are cut away at their inner portions so as to pass close to the rib and conform substantially thereto, and thereby cause an especially effective extruding action of the material from the space between the blade and the rib into the comparatively large open space in the other end of the chamber. Thus it will be understood that each blade not only smears or mashes the rubber against the cylindrical part of the chamber wall, but it also forces, smears or mashes it against the rib 45 in a direction transverse to the rib, said rib being preferably provided with flat, inclined sides over which the material travels inwardly and longitudinally of the cylinder, although the cross-section of the rib may be considerably varied in some cases. In each end of the cylinder, the material is subjected to a maximum amount of working or mastication so that, for example, a mixture of rubber in the form of large chunks with filling or coloring material in powdered form can be reduced in a short time to a smooth plastic mass in which the distribution of the various ingredients is uniform throughout. After being worked in one end of the cylinder, the material is forced into the other end where it is worked again, and it is then forced back into the first end, this operation being repeated indefinitely until the desired results have been obtained.

During this operation, the material is held against the rotor by the pressure plunger or follower 31, and the temperature of the material can be controlled to a certain extent by means of water, steam or other fluid introduced into the mixing chamber wall and the interior of the rotor, which may be made hollow for this purpose. In the present case, we have shown a hollow rotor but we have not considered it necessary to illustrate a jacketed chamber as this in itself is a well-known feature.

Figures 5, 15:
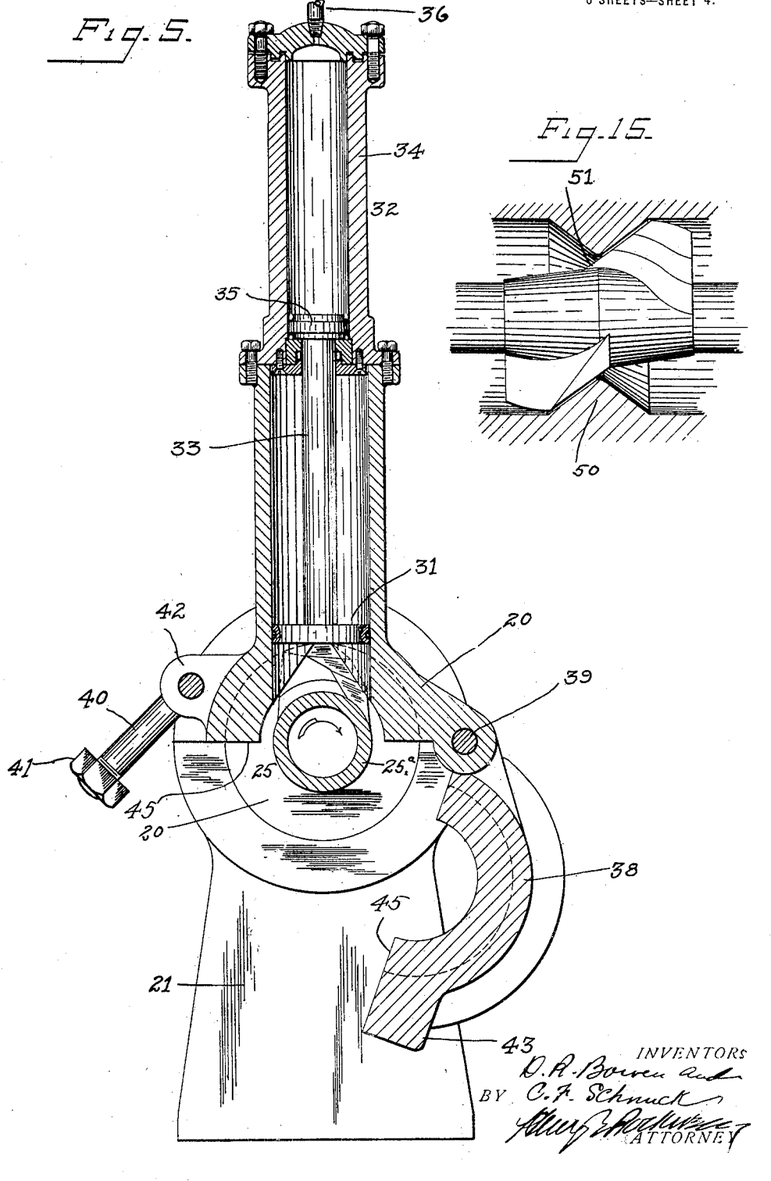
Fig. 5 is a transverse, vertical section of the machine, showing the mixing chamber opened for the discharge of the mixed material, and the pressure plunger in its lowermost position.
Fig. 15 is a sectional view of a slightly modified form of the machine.
Figure 6:
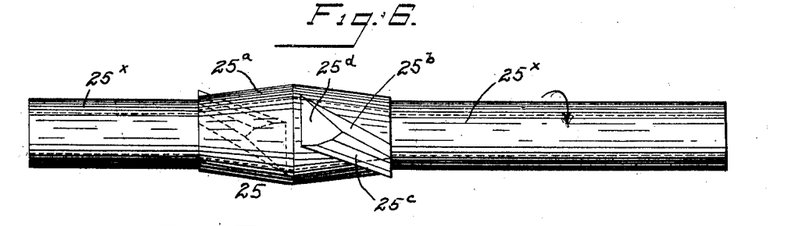
Fig. 6 is a detail side elevation of the rotor.

The mixing or masticating operation having been completed, the machine is discharged by opening the lower part of the mixing chamber, as shown in Fig. 5. The rotation of the rotor is continued until all of the material has been stripped off of the same. In this operation, the main or body portion of the mixing chamber acts in the nature of a stripper, that portion of the rib carried by said body portion being especially effective in this regard. When all of the treated material has been stripped off and discharged, the mixing chamber is again closed, and the pressure plunger is raised preliminary to operation on another batch of material.

In the particular form shown in Fig. 2, the rotor hub is enlarged at the middle portion, being formed, in effect, of two cone frustums with their bases together. The blades 25$^b$ are beveled off at their inner portions to conform to the rib, as shown at 25$^d$, and their inner ends are located closely adjacent the center of the hub and the center of the rib, so as to press the material forcibly through the narrow, annular extrusion opening which is provided at that point, in a direction which is generally lengthwise of the chamber. The outer end portions of the blades are of the full depth, so that their outer edges rotate in close proximity to the cylindrical wall of the chamber, while the edges at the extreme outer ends of the blades rotate in close proximity to the end walls of the chamber. By this construction, the material is effectively smeared or scraped along the walls of the chamber and carried lengthwise of the chamber from one end to the other without the formation of any pockets in which inert material can collect.

Figure 12:
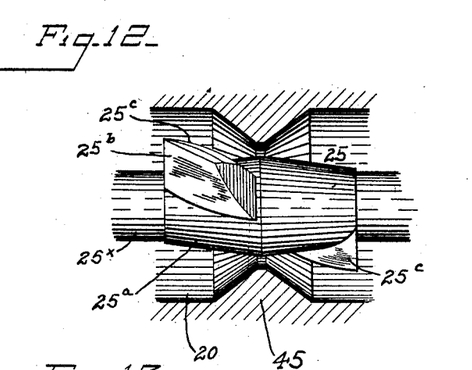
Figs. 12, 13 and 14 are diagrammatic plan views of the rotor and mixing chamber, showing different stages in the operation of the blades
Figure 13:
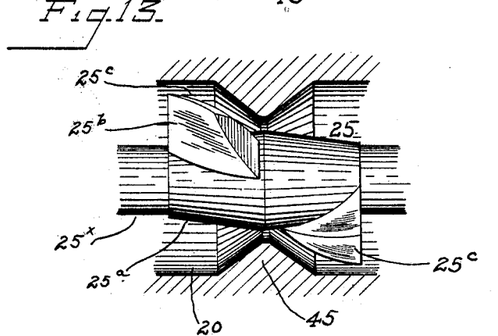
Figure 14:
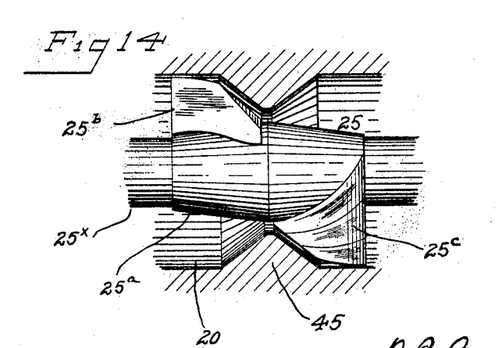

The path of movement taken by the material during the mixing operation will be clear from an inspection of Figs. 12 to 14. It will be apparent that while one blade is forcing and wedging the material against one side face of the rib, and thereby extruding it through the constricted portion of the chamber, the other blade is doing the same thing at the other side face of the rib or other constriction, although, in the example shown, this occurs at a diametrically opposite point. The mixing chamber can be said to consist of two end portions or sections created by constriction of the intermediate part of the chamber, there being an operating blade in each chamber section, which, by rotation therein, forces the material into the other section, whereby an alternate movement of the material from one section to the other by way of the constricted portion is obtained as long as the blades are rotated.

Figure 7:
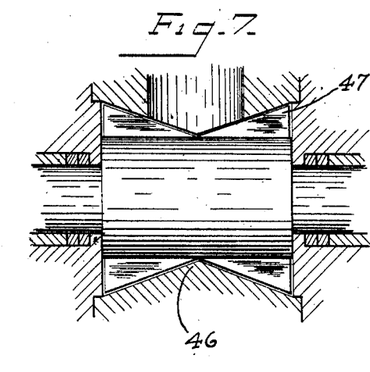
Figs. 7, 8 and 9 illustrate modifications of the mixing chamber and rotor construction.
Figure 8:
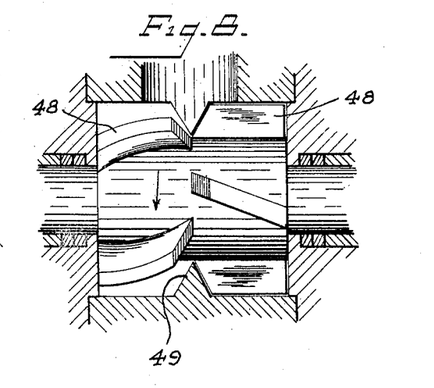
Figure 9:
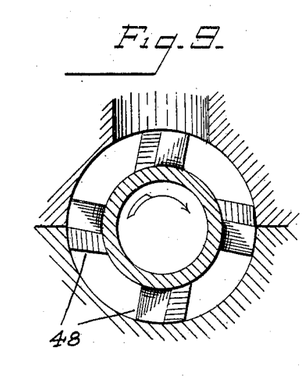

In the broad aspects of our invention, we do not limit ourselves to any particular form of transverse rib or constriction, nor to any particular number or disposition of the blades so long as the general operation hereinbefore described is obtained. In the form shown in Fig. 7, for example, the rib or abutment 46 extends throughout the whole length of the chamber; that is to say, the chamber gradually decreases in diameter from the ends to the center. The blades 47 are shaped to conform to the chamber wall. In the form shown in Figs. 8 and 9, four blades 48 are used at each end of the rotor, i. e. in each compartment of the mixing chamber. This arrangement is particularly intended for a mixer of large capacity, and the number of blades can be still further increased if desired. In this particular embodiment a sharply defined intermediate rib or abutment 49 of V-shaped cross-section is employed. In a machine of this type, the blades of the two series corresponding to the respective compartments or divisions of the chamber are arranged in staggered relation, as shown in Fig. 8 to obtain the alternate movement of the material from one chamber compartment to the other. However, this feature and others may be considerably varied without departure from the scope of the invention as defined in the claims.

In the modification shown in Fig. 15, the rib 50 is similar to the rib 45, shown in Fig. 2, but the arrangement of the blades is slightly different inasmuch as their inner ends are extended farther in an inward direction. The inner blade ends in this example pass slightly beyond the center of the rib, as shown at 51.

In those aspects of the invention which particularly concern the provision of a rib on the chamber wall, we do not limit ourselves to a form in which the rib is integral with the chamber wall. In such aspects, also, the particular point or points at which the machine is charged or discharged, and the arrangement of parts for performing these functions are not material. Furthermore, it is not essential that the transverse rib or its equivalent be fixed to the chamber wall in all cases as other provision may be made in this regard without departure from the scope of our invention.

It will be understood, of course, that in the particular forms shown the transverse rib or abutment extends continuously around the working chamber except for the interruption of the charging opening, and, therefore, a part of said rib is located on the movable discharge section of the chamber or casing, while the other part is located on the fixed or main section. The discharge section preferably extends from one end of the cylinder to the other, and is interposed between the pedestals 21 and positioned thereby. It will be further understood that while I have chosen to illustrate my invention as applied to a rubber mixer provided with one chamber, the invention is not to be limited necessarily to a machine of the single cylinder type, as it may be applied to similar devices having a plurality of chambers.

It will not be understood from what has been said above that we limit ourselves in all aspects of the invention to an arcuate constriction or rib of such length as to provide an extrusion space of approximately annular shape, as the length of the constriction or rib is susceptible of variation as well as the cross-section thereof. Nor do we claim herein a working chamber provided with supporting pedestals, the pedestals being provided with extended sides to form the ends of the chamber, said chamber having a hinged discharge section extending between the chamber ends, or other features of construction or operation claimed in our divisional applications, Serial Nos. 423,365 and 458,222.

We do not claim herein the method of mixing or masticating plastic material as described and claimed in our copending application Serial No. 223,537, filed March 20, 1918.

What we claim is:

1. In a machine of the character described, a mixing chamber, and a bladed element in said chamber, said bladed element coöperating with the walls of the chamber to mash the treated material against said chamber walls and to extrude it from one portion of the chamber into another, and back again, alternately.

2. In a rubber masticator, the combination of a working chamber having a constricted portion, and a rotor working in said chamber to force the material from one end portion thereof through said constricted portion into the other end portion, and back again.

3. In a rubber masticator, a working chamber constricted at its intermediate portion, and a working element in said chamber extending through said constricted portion of the chamber, and constructed and arranged to extrude the treated material through the constricted portion of the chamber in opposite directions.

4. In a machine of the character described, a working cylinder having a constriction therein, and a rotor in said cylinder extending through said constriction, and having blades constructed and arranged to force the material alternately from one end portion of the cylinder into the other and back again.

5. In a machine for mixing materials, a mixing chamber, a rotor operable therein, said chamber and rotor provided with coöperating means to cause a mixing extrusion of said materials.

6. A machine for compounding rubber by working powder into the same, comprising a mixing chamber, a rotor operable therein and means within the chamber for causing a mixing extrusion of said materials.

7. The combination of a working chamber having a transverse extrusion rib intermediate of its ends, and a rotor in said chamber extending longitudinally thereof and having masticating blades coöperating with said rib at opposite sides thereof to extrude the material past said rib.

8. The combination of a working cylinder having a transverse interiorly projecting extrusion rib, and a rotor extending at right angles to the plane of said rib and having masticating blades conforming to said rib and coöperating therewith to cause a mixing extension of the materials in said cylinder.

9. In a machine for mixing materials, a mixing chamber, provided with a constricted portion, a bladed rotor operable in said chamber and coöperating with said constricted portion to cause a mixing extrusion of said materials.

10. In a machine for mixing materials, a mixing chamber provided with a transverse rib intermediate its ends, and a member in said chamber extending longitudinally thereof and provided with blades for causing a mixing extrusion of said materials past said rib.

11. In a machine for treating rubber and similar material, a working chamber, a rotor in said chamber which works the material alternately from one end of the chamber to the other, and means presenting a transverse intermediate constriction in the chamber through which said rotor extends and through which the material is obliged to pass.

12. A machine for mixing rubber chunks with powdered filling and the like, comprising a working chamber, a rotor therein constructed to force the material from one end of the chamber to the other, and an inward, generally arcuate projection in the chamber presenting a partial obstruction to the aforesaid movement of the material, said rotor causing a mixing extrusion of said material through said partially obstructed portion.

13. In a machine for treating rubber and similar material, a working chamber, a rotor therein constructed to force the material from one end of the chamber to the other and back again, and an intermediate abutment over which the material is forced in the aforesaid movement, said abutment curved about an intermediate portion of said rotor and having oppositely inclined side faces.

14. In a machine for treating rubber and similar material, a working chamber, a rotor therein having blades constructed to force the material from one end of the chamber to the other and back again, and a transverse abutment at the intermediate portion of the chamber over which the material is forced by said blades in the aforesaid movement, said blades being shaped to conform closely to said abutment.

15. In a machine of the character described, a working cylinder having an intermediate rib dividing it into two compartments communicating with each other through a constricted space, and a rotor having blades working in the respective compartments, the blades in both compartments coöperating with said rib to extrude the material past said rib.

16. In a machine of the character described, a working cylinder divided into two compartments, a rotor in said cylinder coöperating with an intermediate portion of the interior of said cylinder to present a constricted annular communicating space between the said compartments, and blades on the rotor for causing a mixing extrusion of the material through said communicating space.

17. In a machine of the character described, a working cylinder having intermediate of its ends an inwardly projecting transverse rib, a rotor in said cylinder coöperating with said rib to present a restricted annular communicating space between the respective end portions of the cylinder, and blades on the rotor in said end portions adapted to force the material through said communicating space.

18. In a machine of the character described, a working cylinder having intermediate of its ends an inwardly projecting transverse rib, a rotor in said cylinder coöperating with said rib to present a restricted annular communicating space between the respective end portions of the cylinder, and blades on the rotor in said end portions adapted to force the material through said communicating space, said rib being substantially V-shaped in cross-section.

19. In a machine of the character described, a working chamber symmetrically reduced in cross-section toward a point intermediate the ends, and a rotor working in said chamber and having smearing blades conforming to the side wall of the chamber, said blades constructed to work the material in said chamber back and forth.

20. In a machine for masticating rubber and the like, means presenting a containing space and an extrusion space, and means for forcing the material through said extrusion space alternately in opposite directions, said means extending through said extrusion space.

21. In a machine for incorporating powdered filling or other material in a rubber mass, a working chamber which receives the batch, and a rotary element in said chamber having a blade, said chamber and element presenting in conjunction an extrusion space independent of the blade through which the latter forces the mass for producing a mixing extrusion of the materials.

22. In a rubber masticator, a working chamber, a rotor therein, a rib constricting the space between the intermediate part of the rotor and the adjacent chamber wall, and a blade or blades on the rotor for forcing the material over said rib, said blade or blades being shaped to conform to said rib.

23. A machine for mixing rubber chunks with powdered filling or the like, a working chamber containing materials to be mixed and means for causing a mixing extrusion of said materials through said chamber.

24. In a machine of the character described, a working cylinder having an opening in its side wall, a rotor in said cylinder, and a transversely arranged arcuate rib in line with said opening.

25. In a machine of the character described, a working cylinder having an opening in its side wall, a rotor in said cylinder, and transversely arranged arcuate rib portions adjacent opposite sides of said opening.

26. In a machine of the character described, a stator and rotor constructed to provide a working chamber having a restricted passage with the rotor extending through said passage, said rotor constructed to extrude the material to be mixed through said passage alternately in opposite directions.

27. In a machine of the character described, a working cylinder longitudinally divided into sections, and a transverse inwardly-projecting rib on at least one of said sections, the plane of said rib being substantially parallel to the ends of said cylinder.

28. In a machine of the character described, a working cylinder longitudinally divided into sections and having an opening in one of said sections, rib portions extending into proximity to opposite edges of said opening, and a rotor in said cylinder having blades to force the material past said rib portions.

29. A material working rotor provided with a blade having a faceted working face.

30. The combination of a working chamber, and a material working rotor therein having a blade provided with a faceted working face.

31. The combination of a working chamber having an extrusion rib, and a rotor in said chamber provided with blades constructed to work the material back and forth past said rib, said blades provided with faceted working faces.

32. The combination of a working chamber having vertical end walls, a rotor therein provided with blades, said blades having one face extending parallel to said end walls and an opposite face inclined to said first mentioned face.

33. In a machine for working powder into rubber, a container to receive the materials, a rotary mixing element in the container and means for causing a repeated to-and-fro extrusion of the materials in the container by the rotation of said mixing element to work the powder thoroughly into the rubber.

34. In a machine for mixing or masticating rubber or similar material, a material-receiving chamber, and means for squeezing substantially the whole mass contained in the chamber through a space or spaces in the chamber of such constricted cross-section as to produce an extrusion with a thorough rearrangement of the molecules to mix or work the material effectively and rapidly preliminary to discharge from said chamber.

35. In a machine for mixing or masticating rubber or similar material, means for receiving a batch of rubber chunks and powder to be worked into the same, means for repeatedly squeezing portions of the mass from one part of the chamber to another through a space or spaces of such constricted cross-section as to produce a mixing extrusion of the stiff coherent mass with a thorough rearrangement of the molecules until the whole mass is plastic and substantially homogeneous.

36. In a machine for mixing or masticating rubber or similar material, a chamber for receiving a batch of rubber chunks and powder to be worked into the same, and means within the chamber for repeatedly squeezing the mass from one part of the chamber to another through a space of such constricted cross-section as to produce an extrusion of the stiff coherent mass, whereby the mass is thoroughly worked or mixed and rendered plastic, and means independent of the squeezing means providing for discharge of the material.

37. In a machine for mixing or masticating rubber or similar material, the combination of a chamber, for receiving a batch of rubber chunks and powder to be worked into the same, presenting a restricted interior space, and means for thoroughly working the mass and rendering it plastic by forcing it repeatedly through such space, the latter being of such area as to produce an extrusion of the mass while the machine is in operation.

38. In a machine for mixing or masticating rubber or similar material, a chamber and a rotor therein having a space for receiving a batch of material and also presenting in conjunction a restricted extrusion space through which the mass is continuously forced during the rotation of the rotor to produce a mixing extrusion action and thereby thoroughly work the material.

39. In a machine for mixing or masticating rubber or similar material, a chamber having an intermediate extrusion opening, and means for forcing material under heavy pressure through the opening alternately in oppositely directions to produce an extrusion of the whole mass, and thereby thoroughly work or mix the same.

40. In a machine for mixing or masticating rubber or similar material, a material-receiving chamber, a blade therein, said machine being constructed to present an extrusion opening independent of the blade through which the material is repeatedly forced by said blade to produce an extrusion with a thorough rearrangement of the molecules so long as the blade is rotated.

41. In a machine for compounding rubber, a chamber adapted to receive the imperfectly mixed ingredients, means associated with said chamber presenting a relatively small extrusion opening, and a rotary bladed member having an axis disposed at an angle to the plane of said opening for extruding the material through the latter.

42. In a machine for mixing or masticating rubber or similar material, having a chamber, a forcing blade therein, and means whereby when the blade is engaged with the mass the latter is forced from one part of the chamber to another through an extrusion opening or openings independent of the blade for thoroughly and repeatedly working the mass by an extrusion action.

43. In a machine of the character described for mixing or masticating rubber or the like, the combination with a chamber for receiving a batch of rubber chunks and powder to be worked into the same, of means in the chamber for mixing the mass by repeatedly extruding portions of the mass until the desired plasticity and homogeneity are obtained.

44. In a machine for mixing or masticating rubber or similar material, a chamber, a blade, and means in conjunction with the chamber and blade presenting an extrusion opening through which the material is repeatedly worked alternately in opposite directions to produce an extrusion action and thereby rearrange the molecules of the whole mass until the same is plastic and substantially homogeneous.

45. In a machine of the character described, a working chamber, a longitudinally extending rotor in said chamber having masticating blades, and means presenting a generally transverse extrusion rib within the chamber over which the material is forced by said blades for working or mixing such material thoroughly, whereby the mass is rendered plastic, smooth and homogeneous.

46. In a machine of the character described, a working cylinder, a bladed element therein for working the material, and means in conjunction with the cylinder and blade presenting an intermediate division in the chamber past which the material is forced and thereby extruded from one chamber end to the other and thoroughly worked or mixed.

47. In a machine of the character described, a chamber adapted to receive a batch of rubber chunks and powder to be worked into the same to be mixed or masticated for the purpose of rendering the same plastic, smooth and homogeneous, a rotary bladed element in said chamber, and means operating in conjunction with said chamber and bladed element whereby the latter forces the material under heavy pressure through a chamber portion of such small area as to produce a mixing extrusion of the mass which is continued as long as the bladed element rotates to thereby thoroughly and repeatedly work or mix all portions of the mass by extrusion.

48. In a machine for mixing or masticating rubber or the like, a chamber for receiving a batch of rubber chunks and powder to be worked into the same, means for repeatedly extruding the stiff, coherent mass while it remains in the chamber, for working or mixing the material with great thoroughness, and means independent of said last means providing for discharge of the finished batch from said chamber.

49. In a rubber compounding machine, a chamber to receive the ingredients to be mixed, means to mix the mass by extrusion while it remains in said chamber, and means independent of said last means providing for the discharge of the machine.

In witness whereof, we have hereunto set our hands on the 12th day of September, 1917.

DAVID R. BOWEN.
CARL F. SCHNUCK.